Oct. 14, 1924. 1,511,261
C. BROWN
CONTROL DEVICE FOR CARBURETORS AND OTHER APPARATUS USED ON VEHICLES
Filed Oct. 11, 1922

Inventor.
Clement Brown
By B. Singer, Atty.

Patented Oct. 14, 1924.

1,511,261

UNITED STATES PATENT OFFICE.

CLEMENT BROWN, OF BIRMINGHAM, ENGLAND.

CONTROL DEVICE FOR CARBURETORS AND OTHER APPARATUS USED ON VEHICLES.

Application filed October 11, 1922. Serial No. 593,926.

*To all whom it may concern:*

Be it known that I, CLEMENT BROWN, a subject of the Kingdom of Great Britain, residing at 19 Trinity Road, Birchfield, Birmingham, England, have invented Improvements in or Relating to Control Devices for Carburetors and Other Apparatus Used on Vehicles, of which the following is a specification.

This invention comprises certain improvements in or relating to control devices for carburetors and other apparatus used on vehicles, and it consists in the combination of a rotating or oscillating handlebar grip with Bowden transmission mechanism. This invention further comprehends a rotating handlebar grip which is of a character such that it could be applied to an existing handlebar.

In order that this invention may be clearly understood and readily carried into practice, reference may be had to the appended explanatory sheet of drawings, upon which:—

Figure 1:
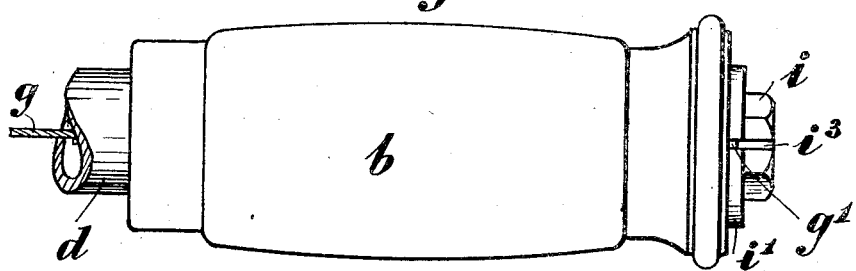
Figure 1 is an external elevation of an actuating device according to the present invention.
Figure 2:
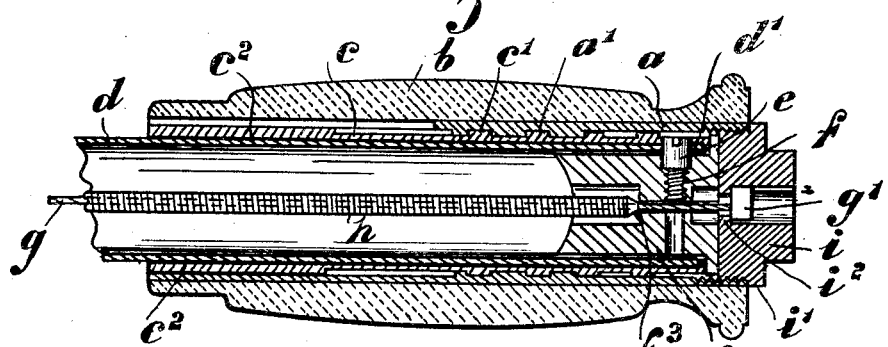
Figure 2 is a sectional elevation of the device shown in Figure 1.
Figure 3:
Figures 3, 4 and 5 illustrate separately internal parts of the mechanism shown in Figure 2.
Figure 4:
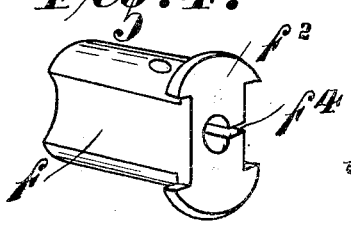
Figure 5:
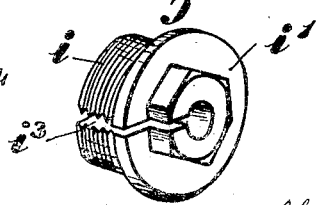

In a convenient embodiment of the present invention, I provide a handlebar grip proper consisting of a tubulus $a$ which may externally be fitted with a rubber covering $b$ adapted to be gripped by the hand, and which tubulus $a$ has internally a female screw thread or helix $a^1$ adapted to cooperate with a male screw thread or helix $c^1$ provided upon another tube or sleeve $c$ telescoping within the first-mentioned tubulus $a$, and the inner tube or sleeve $c$ is adapted to be secured in a position encircling the end of the handlebar $d$. For this purpose the latter may, if necessary, be slightly shortened and perforated near its end, after which the inner sleeve $c$ can be secured in position by a grub screw $e$ passing through the sleeve $c$ and perforation $d^1$ in the handlebar, and into a tapped blind hole $f^1$ in a plug $f$ hereinafter to be mentioned which is inserted within the handlebar tube $d$. The inner sleeve $c$ may in its fore part be of enlarged diameter $c^2$ to form a bearing for the fore part of the outer sleeve or grip body, the engaging helices being in the rear part or half of the telescopic sleeves. When, therefore, the grip is rotated it is consequently displaced rearwardly. To the rear extremity of the outer sleeve $a$ or grip body a Bowden cable $g$ is secured. For this purpose I may provide a plug $f$ adapted to be projected into the handlebar tube $d$ and flanged at $f^2$ at its rear end so that the flange butts against the rear extremity of the tube $c$. The plug $f$ is centrally perforated, the perforation being of larger diameter in its fore part than its rear part, and the part of this perforation of larger diameter is adapted to receive the end of the Bowden sheath $h$, which latter butts against the shoulder $f^3$ formed at the juncture of the larger with the smaller part of the boring or perforation. The Bowden cable $g$ passes through the smaller part of the perforation and is secured to a cap or closure member $i$ which is adapted to be screwed into the rear extremity of the grip body or outer sleeve $a$. This closure member $i$ is flanged at $i^1$ to limit the extent to which it can be screwed into position. At its rear end the cable is fitted with a plug $g^1$ having a shoulder which engages with a shoulder $i^2$ in a perforation provided in the closure member. To the one side of this perforation in the closure member another perforation is provided adjoining the central perforation in a narrow slot $i^3$. The enlargement $g^1$ upon the end of the cable $g$ can be drawn rearwardly out of the closure, the wire then passed laterally into the other perforation, and the cable abutment then passed through this other perforation for disconnecting the cable from the closure member.

The plug $f$ is also formed with a lateral slot $f^4$ through which the cable $g$, but not the sheath $h$, may be passed for disassemblage from the plug $f$, and said plug $f$ is furnished with the blind internally tapped hole by which it is secured within the handlebar by the grub screw $f^1$ aforementioned.

One or both grips may be mounted or provided according to the present invention in the latter case for the operation of more than one control member.

What I claim as my invention and desire to secure by Letters Patent is:—

A control device for carburetors and other apparatus used on vehicles, comprising in combination, two coaxial sleeves having helical projections upon their adjacent surfaces, adapted to intermesh with one another, a twist handle secured coaxially to the outer sleeve so as to embrace the same, a flanged plug adapted to be inserted in one end of said inner sleeve to form an abutment for a Bowden sheath, means whereby said flanged plug may be secured to said inner sleeve, and a nipple connection adapted to receive a Bowden wire and to be secured in one end of said outer sleeve, said plug and said nipple connection having lateral slots to facilitate the assemblage of the Bowden connection.

In witness whereof I have hereunto set my hand.

CLEMENT BROWN.